US009296624B2

United States Patent
Duesel, Jr. et al.

(10) Patent No.: US 9,296,624 B2
(45) Date of Patent: Mar. 29, 2016

(54) PORTABLE COMPACT WASTEWATER CONCENTRATOR

(71) Applicant: HEARTLAND TECHNOLOGY PARTNERS LLC, St. Louis, MO (US)

(72) Inventors: Bernard F. Duesel, Jr., Goshen, NY (US); Michael J. Rutsch, Pittsburgh, PA (US); Craig Clerkin, Stoughton, WI (US); Robert F. Irwin, IV, Moorestown, NJ (US)

(73) Assignee: HEARTLAND TECHNOLOGY PARTNERS LLC, St Louis, MO (US)

( * ) Notice: Subject to any disclaimer, the term of this patent is extended or adjusted under 35 U.S.C. 154(b) by 126 days.

(21) Appl. No.: 13/649,535

(22) Filed: Oct. 11, 2012

(65) Prior Publication Data
US 2013/0087487 A1    Apr. 11, 2013

Related U.S. Application Data

(60) Provisional application No. 61/545,866, filed on Oct. 11, 2011.

(51) Int. Cl.
| C02F 1/00 | (2006.01) |
| C02F 1/04 | (2006.01) |
| B01D 1/00 | (2006.01) |
| B01D 1/14 | (2006.01) |

(52) U.S. Cl.
CPC ............ *C02F 1/048* (2013.01); *B01D 1/0058* (2013.01); *B01D 1/14* (2013.01); *C02F 2201/008* (2013.01); *C02F 2301/046* (2013.01); *Y10T 29/49817* (2015.01)

(58) Field of Classification Search
None
See application file for complete search history.

(56) References Cited

U.S. PATENT DOCUMENTS

| 2,372,846 A | 4/1945 | Frederick et al. |
| 2,387,818 A | 10/1945 | Wethly |

(Continued)

FOREIGN PATENT DOCUMENTS

| CL | 757-2004 | 5/2007 |
| DE | 556 455 C | 8/1932 |
| DE | 1 173 429 B | 7/1964 |
| EP | 0 047 044 A1 | 3/1982 |
| FR | 2 441 817 A1 | 6/1980 |
| GB | 383570 A | 11/1932 |
| GB | 463770 A | 4/1937 |

(Continued)

OTHER PUBLICATIONS

Jones, "Liquid Circulation in a Draft-Tube Bubble Column," *Chemical Engineering Science*, 40(3):449-462 (1985).

(Continued)

*Primary Examiner* — Duane Smith
*Assistant Examiner* — Phillip Shao
(74) *Attorney, Agent, or Firm* — Marshall, Gerstein & Borun LLP

(57) ABSTRACT

A compact and portable liquid concentrator includes a gas inlet, a gas exit and a flow corridor connecting the gas inlet and the gas exit, wherein the flow corridor includes a narrowed portion that accelerates the gas through the flow corridor. A liquid inlet injects liquid into the gas stream at a point prior to the narrowed portion so that the gas-liquid mixture is thoroughly mixed within the flow corridor, causing a portion of the liquid to be evaporated. A demister or fluid scrubber downstream of the narrowed portion removes entrained liquid droplets from the gas stream and re-circulates the removed liquid to the liquid inlet through a re-circulating circuit. The compact and portable liquid concentrator is mountable on a truck bed or skid for easy transportation to remote sites.

6 Claims, 4 Drawing Sheets

(56) References Cited

U.S. PATENT DOCUMENTS

| | | |
|---|---|---|
| 2,468,455 A | 4/1949 | Metziger |
| 2,560,226 A | 7/1951 | Joos et al. |
| 2,619,421 A | 11/1952 | Greenfield |
| 2,651,647 A | 9/1953 | Greenfield |
| 2,658,349 A | 11/1953 | Keller |
| 2,658,735 A | 11/1953 | Ybarrondo |
| 2,721,065 A | 10/1955 | Ingram |
| 2,790,506 A | 4/1957 | Vactor |
| 2,867,972 A | 1/1959 | Hokderreed et al. |
| 2,879,838 A | 3/1959 | Flynt et al. |
| 2,890,166 A | 6/1959 | Heinze |
| 2,911,421 A | 11/1959 | Greenfield |
| 2,911,423 A | 11/1959 | Greenfield |
| 2,979,408 A | 4/1961 | Greenfield |
| 2,981,250 A | 4/1961 | Steward |
| 3,060,921 A | 10/1962 | Luring et al. |
| 3,076,715 A | 2/1963 | Greenfield |
| 3,203,875 A | 8/1965 | Harris |
| 3,211,538 A | 10/1965 | Gross et al. |
| 3,212,235 A | 10/1965 | Markant |
| 3,251,398 A | 5/1966 | Greenfield |
| 3,268,443 A | 8/1966 | Cann |
| 3,284,064 A | 11/1966 | Kolm et al. |
| 3,299,651 A | 1/1967 | McGrath |
| 3,304,991 A | 2/1967 | Greenfield |
| 3,306,039 A | 2/1967 | Peterson |
| 3,323,575 A | 6/1967 | Greenfield |
| 3,405,918 A | 10/1968 | Calaceto et al. |
| 3,432,399 A | 3/1969 | Schutt |
| 3,539,549 A | 11/1970 | Greenfield |
| 3,578,892 A | 5/1971 | Wilkinson |
| 3,601,374 A | 8/1971 | Wheeler |
| 3,638,924 A | 2/1972 | Calaceto et al. |
| 3,704,570 A | 12/1972 | Gardenier |
| 3,713,786 A | 1/1973 | Umstead |
| 3,716,458 A | 2/1973 | Greenfield et al. |
| 3,730,673 A | 5/1973 | Straitz, III |
| 3,743,483 A | 7/1973 | Shah |
| 3,754,869 A | 8/1973 | Van Raden |
| 3,756,580 A | 9/1973 | Dunn |
| 3,756,893 A | 9/1973 | Smith |
| 3,762,893 A | 10/1973 | Larsen |
| 3,782,300 A | 1/1974 | White et al. |
| 3,789,902 A | 2/1974 | Shah et al. |
| 3,826,096 A | 7/1974 | Hrusch |
| 3,838,974 A | 10/1974 | Hemsath et al. |
| 3,838,975 A | 10/1974 | Tabak |
| 3,840,002 A | 10/1974 | Douglas et al. |
| 3,855,079 A | 12/1974 | Greenfield et al. |
| 3,870,585 A | 3/1975 | Kearns et al. |
| 3,876,490 A | 4/1975 | Tsuruta |
| 3,880,756 A | 4/1975 | Raineri et al. |
| 3,898,134 A | 8/1975 | Greenfield et al. |
| 3,901,643 A | 8/1975 | Reed et al. |
| 3,915,620 A | 10/1975 | Reed |
| 3,917,508 A | 11/1975 | Greenfield et al. |
| 3,925,148 A | 12/1975 | Erwin |
| 3,944,215 A | 3/1976 | Beck |
| 3,945,331 A | 3/1976 | Drake et al. |
| 3,947,215 A | 3/1976 | Peterson et al. |
| 3,947,327 A | 3/1976 | Greenfield et al. |
| 3,950,230 A | 4/1976 | Greenfield et al. |
| 3,994,671 A | 11/1976 | Straitz, III |
| 4,001,077 A | 1/1977 | Kemper |
| 4,007,094 A | 2/1977 | Greenfield et al. |
| 4,012,191 A | 3/1977 | Lisankie et al. |
| 4,013,516 A | 3/1977 | Greenfield et al. |
| 4,026,682 A | 5/1977 | Pausch |
| 4,036,576 A | 7/1977 | McCracken |
| 4,070,423 A | 1/1978 | Pierce |
| 4,079,585 A | 3/1978 | Helleur |
| 4,080,883 A | 3/1978 | Zink et al. |
| 4,092,908 A | 6/1978 | Straitz, III |
| 4,118,173 A | 10/1978 | Shakiba |
| 4,119,538 A | 10/1978 | Yamauchi et al. |
| 4,140,471 A | 2/1979 | Straitz, III et al. |
| 4,154,570 A | 5/1979 | Schwartz |
| 4,157,239 A | 6/1979 | Reed |
| 4,181,173 A | 1/1980 | Pringle |
| 4,185,685 A | 1/1980 | Giberson |
| 4,198,198 A | 4/1980 | Straitz, III |
| 4,227,897 A | 10/1980 | Reed |
| 4,230,536 A | 10/1980 | Sech |
| 4,257,746 A | 3/1981 | Wells |
| 4,259,185 A | 3/1981 | Mixon |
| 4,264,826 A | 4/1981 | Ullmann |
| 4,270,974 A | 6/1981 | Greenfield et al. |
| 4,276,115 A | 6/1981 | Greenfield et al. |
| 4,285,578 A | 8/1981 | Yamashita et al. |
| 4,300,924 A | 11/1981 | Coyle |
| 4,306,858 A | 12/1981 | Simon |
| 4,336,101 A | 6/1982 | Greenfield et al. |
| 4,346,660 A | 8/1982 | McGill |
| RE31,185 E | 3/1983 | Greenfield et al. |
| 4,430,046 A | 2/1984 | Cirrito |
| 4,432,914 A | 2/1984 | Schifftner |
| 4,440,098 A | 4/1984 | Adams |
| 4,445,464 A | 5/1984 | Gerstmann et al. |
| 4,445,842 A | 5/1984 | Syska |
| 4,450,901 A | 5/1984 | Janssen |
| 4,485,746 A | 12/1984 | Erlandsson |
| 4,496,314 A | 1/1985 | Clarke |
| 4,518,458 A | 5/1985 | Greenfield et al. |
| 4,538,982 A | 9/1985 | McGill et al. |
| 4,583,936 A | 4/1986 | Krieger |
| 4,608,120 A | 8/1986 | Greenfield et al. |
| 4,613,409 A | 9/1986 | Volland |
| 4,648,973 A | 3/1987 | Hultholm et al. |
| 4,652,233 A | 3/1987 | Hamazaki et al. |
| 4,658,736 A | 4/1987 | Walter |
| 4,683,062 A | 7/1987 | Krovak et al. |
| 4,689,156 A | 8/1987 | Zibrida |
| 4,693,304 A | 9/1987 | Volland |
| 4,771,708 A | 9/1988 | Douglass, Jr. |
| 4,838,184 A | 6/1989 | Young et al. |
| 4,863,644 A | 9/1989 | Harrington et al. |
| 4,882,009 A | 11/1989 | Santoleri et al. |
| 4,890,672 A | 1/1990 | Hall |
| 4,909,730 A | 3/1990 | Roussakis et al. |
| 4,913,065 A | 4/1990 | Hemsath |
| 4,938,899 A | 7/1990 | Oros et al. |
| 4,952,137 A | 8/1990 | Schwartz et al. |
| 4,961,703 A | 10/1990 | Morgan |
| 5,009,511 A | 4/1991 | Sarko et al. |
| 5,028,298 A | 7/1991 | Baba et al. |
| 5,030,428 A | 7/1991 | Dorr et al. |
| 5,032,230 A | 7/1991 | Shepherd |
| 5,068,092 A | 11/1991 | Aschauer |
| 5,076,895 A | 12/1991 | Greenfield et al. |
| 5,132,090 A | 7/1992 | Volland |
| 5,154,898 A | 10/1992 | Ajinkya et al. |
| 5,176,798 A | 1/1993 | Rodden |
| 5,183,563 A | 2/1993 | Rodden |
| 5,227,017 A | 7/1993 | Tanaka et al. |
| 5,230,167 A * | 7/1993 | Lahoda et al. ............... 34/75 |
| 5,238,580 A | 8/1993 | Singhvi |
| 5,279,356 A | 1/1994 | Bruhn |
| 5,279,646 A | 1/1994 | Schwab |
| 5,336,284 A | 8/1994 | Schifftner |
| 5,342,482 A | 8/1994 | Duesel, Jr. |
| D350,838 S | 9/1994 | Johnson |
| 5,347,958 A | 9/1994 | Gordon, Jr. |
| 5,423,979 A | 6/1995 | Allen |
| 5,460,511 A | 10/1995 | Grahn |
| 5,484,471 A | 1/1996 | Schwab |
| 5,512,085 A | 4/1996 | Schwab |
| 5,527,984 A | 6/1996 | Stultz et al. |
| 5,585,005 A | 12/1996 | Smith et al. |
| 5,630,913 A | 5/1997 | Tajer-Ardebili |
| 5,632,864 A | 5/1997 | Enneper |
| 5,636,623 A | 6/1997 | Panz et al. |
| 5,648,048 A | 7/1997 | Kuroda et al. |
| 5,656,155 A | 8/1997 | Norcross et al. |
| 5,662,802 A | 9/1997 | Heins et al. |

(56) References Cited

U.S. PATENT DOCUMENTS

| | | |
|---|---|---|
| 5,695,614 A | 12/1997 | Hording et al. |
| 5,695,643 A | 12/1997 | Brandt et al. |
| 5,735,680 A | 4/1998 | Henkelmann |
| 5,749,719 A | 5/1998 | Rajewski |
| 5,759,233 A | 6/1998 | Schwab |
| 5,810,578 A | 9/1998 | Hystad et al. |
| 5,865,618 A | 2/1999 | Hiebert |
| 5,879,563 A | 3/1999 | Garbutt |
| 5,925,223 A | 7/1999 | Simpson et al. |
| 5,934,207 A | 8/1999 | Echols et al. |
| 5,951,743 A | 9/1999 | Hsieh et al. |
| 5,958,110 A | 9/1999 | Harris et al. |
| 5,968,320 A | 10/1999 | Sprague |
| 5,968,352 A | 10/1999 | Ditzler |
| 6,007,055 A | 12/1999 | Schifftner |
| 6,119,458 A | 9/2000 | Harris et al. |
| 6,149,137 A | 11/2000 | Johnson et al. |
| 6,250,916 B1 | 6/2001 | Philippe et al. |
| 6,276,872 B1 | 8/2001 | Schmitt |
| 6,293,277 B1 | 9/2001 | Panz et al. |
| 6,332,949 B1 | 12/2001 | Beckhaus et al. |
| 6,345,495 B1 | 2/2002 | Cummings |
| 6,383,260 B1 | 5/2002 | Schwab |
| 6,391,100 B1 | 5/2002 | Hogan |
| 6,391,149 B1 | 5/2002 | Calfee et al. |
| 6,402,816 B1 | 6/2002 | Trivett et al. |
| 6,435,860 B1 | 8/2002 | Brookshire et al. |
| 6,468,389 B1 | 10/2002 | Harris et al. |
| 6,485,548 B1 | 11/2002 | Hogan |
| 6,500,216 B1 | 12/2002 | Takayasu |
| 6,616,733 B1 | 9/2003 | Pellegrin |
| 6,632,083 B1 | 10/2003 | Bussman et al. |
| 6,719,829 B1 | 4/2004 | Schwab |
| 6,733,636 B1 | 5/2004 | Heins |
| 6,742,337 B1 | 6/2004 | Hays et al. |
| 6,752,920 B2 | 6/2004 | Harris et al. |
| 6,913,671 B2 | 7/2005 | Bolton et al. |
| 6,919,000 B2 | 7/2005 | Klausner et al. |
| 6,926,757 B2 | 8/2005 | Kalliokoski et al. |
| 6,936,140 B2 | 8/2005 | Paxton et al. |
| 7,037,434 B2 | 5/2006 | Myers et al. |
| 7,069,991 B2 | 7/2006 | Gudmestad et al. |
| 7,073,337 B2 | 7/2006 | Mangin |
| 7,074,339 B1 | 7/2006 | Mims |
| 7,077,201 B2 | 7/2006 | Heins |
| 7,111,673 B2 | 9/2006 | Hugill |
| 7,142,298 B2 | 11/2006 | Nuspliger |
| 7,144,555 B1 | 12/2006 | Squires et al. |
| 7,150,320 B2 | 12/2006 | Heins |
| 7,156,985 B1 | 1/2007 | Frisch |
| 7,166,188 B2 | 1/2007 | Kedem et al. |
| 7,214,290 B2 | 5/2007 | Duesel, Jr. et al. |
| 7,225,620 B2 | 6/2007 | Klausner et al. |
| 7,288,186 B2 | 10/2007 | Harris |
| 7,332,010 B2 | 2/2008 | Steiner |
| 7,402,247 B2 | 7/2008 | Sutton |
| 7,416,172 B2 | 8/2008 | Duesel, Jr. et al. |
| 7,416,177 B2 | 8/2008 | Suzuki et al. |
| 7,424,999 B2 | 9/2008 | Xu et al. |
| 7,428,926 B2 | 9/2008 | Heins |
| 7,438,129 B2 | 10/2008 | Heins |
| 7,442,035 B2 | 10/2008 | Duesel, Jr. et al. |
| 7,459,135 B2 | 12/2008 | Pieterse et al. |
| 7,572,626 B2 | 8/2009 | Frisch et al. |
| 7,591,309 B2 | 9/2009 | Minnich et al. |
| 7,614,367 B1 | 11/2009 | Frick |
| 7,661,662 B2 | 2/2010 | Forstmanis |
| 7,681,643 B2 | 3/2010 | Heins |
| 7,717,174 B2 | 5/2010 | Heins |
| 7,758,819 B2 | 7/2010 | Nagelhout |
| 7,832,714 B2 | 11/2010 | Duesel, Jr. et al. |
| 7,955,419 B2 | 6/2011 | Casella |
| 8,066,844 B2 | 11/2011 | Duesel, Jr. et al. |
| 8,066,845 B2 | 11/2011 | Duesel, Jr. et al. |
| 8,114,287 B2 | 2/2012 | Harris |
| 8,136,797 B2 | 3/2012 | Duesel, Jr. et al. |
| 8,679,291 B2 * | 3/2014 | Duesel et al. ............ 159/2.1 |
| 2001/0013666 A1 | 8/2001 | Nomura et al. |
| 2002/0069838 A1 | 6/2002 | Rautenbach et al. |
| 2003/0104778 A1 | 6/2003 | Liu |
| 2003/0127226 A1 | 7/2003 | Heins |
| 2004/0000515 A1 | 1/2004 | Harris et al. |
| 2004/0031424 A1 | 2/2004 | Pope |
| 2004/0040671 A1 | 3/2004 | Duesel et al. |
| 2004/0045681 A1 | 3/2004 | Bolton et al. |
| 2004/0045682 A1 | 3/2004 | Liprie |
| 2004/0079491 A1 | 4/2004 | Harris et al. |
| 2005/0022989 A1 | 2/2005 | Heins |
| 2005/0074712 A1 | 4/2005 | Brookshire et al. |
| 2005/0230238 A1 | 10/2005 | Klausner et al. |
| 2005/0242036 A1 | 11/2005 | Harris |
| 2005/0279500 A1 | 12/2005 | Heins |
| 2006/0000355 A1 | 1/2006 | Ogura et al. |
| 2006/0032630 A1 | 2/2006 | Heins |
| 2007/0051513 A1 | 3/2007 | Heins |
| 2007/0084808 A1 * | 4/2007 | Williamson et al. ......... 210/806 |
| 2007/0114683 A1 | 5/2007 | Duesel et al. |
| 2007/0175189 A1 | 8/2007 | Gomiciaga-Pereda et al. |
| 2007/0251650 A1 | 11/2007 | Duesel et al. |
| 2008/0110417 A1 | 5/2008 | Smith |
| 2008/0115361 A1 | 5/2008 | Santini et al. |
| 2008/0173176 A1 | 7/2008 | Duesel et al. |
| 2008/0173590 A1 | 7/2008 | Duesel et al. |
| 2008/0174033 A1 | 7/2008 | Duesel et al. |
| 2008/0213137 A1 | 9/2008 | Frisch et al. |
| 2008/0265446 A1 | 10/2008 | Duesel et al. |
| 2008/0272506 A1 | 11/2008 | Duesel et al. |
| 2008/0277262 A1 | 11/2008 | Harris |
| 2009/0078416 A1 | 3/2009 | Heins |
| 2009/0127091 A1 | 5/2009 | Heins |
| 2009/0294074 A1 | 12/2009 | Forstmanis |
| 2010/0095763 A1 | 4/2010 | Harris |
| 2010/0126931 A1 | 5/2010 | Capeau et al. |
| 2010/0139871 A1 | 6/2010 | Rasmussen et al. |
| 2010/0176042 A1 | 7/2010 | Duesel, Jr. et al. |
| 2010/0224364 A1 | 9/2010 | Heins |
| 2010/0236724 A1 | 9/2010 | Duesel, Jr. et al. |
| 2011/0005999 A1 * | 1/2011 | Randal ............ 210/614 |
| 2011/0061816 A1 | 3/2011 | Duesel, Jr. et al. |
| 2011/0083556 A1 | 4/2011 | Duesel, Jr. et al. |
| 2011/0100924 A1 | 5/2011 | Duesel, Jr. et al. |
| 2011/0132815 A1 * | 6/2011 | Angelilli et al. ............ 210/88 |
| 2011/0147195 A1 | 6/2011 | Shapiro et al. |
| 2011/0168646 A1 | 7/2011 | Tafoya |
| 2011/0180470 A1 | 7/2011 | Harris |
| 2011/0240540 A1 | 10/2011 | Harris |
| 2012/0012309 A1 * | 1/2012 | Noles, Jr. ............ 166/267 |
| 2012/0205303 A1 | 8/2012 | Rosine et al. ............ 210/198.1 |
| 2012/0211441 A1 | 8/2012 | Harris |
| 2012/0273367 A1 * | 11/2012 | Themy et al. ............ 205/756 |

FOREIGN PATENT DOCUMENTS

| | | |
|---|---|---|
| JP | 60257801 | 12/1985 |
| JP | 62121687 | 6/1987 |
| JP | 2003/021471 A | 1/2003 |
| WO | WO-96/10544 A2 | 4/1996 |
| WO | WO-2004/022487 A2 | 3/2004 |
| WO | WO-2005/110608 A1 | 11/2005 |
| WO | WO-2008/112793 A1 | 9/2008 |
| WO | WO-2009/071763 A1 | 6/2009 |
| WO | WO-2010/092265 A1 | 8/2010 |
| WO | WO-2011/042693 A2 | 4/2011 |
| WO | WO-2011/050317 A2 | 4/2011 |
| WO | WO-2012/100074 A2 | 7/2012 |

OTHER PUBLICATIONS

Talbert et al., "The Elecrospouted Bed," *IEEE Transactions on Industry Applications*, vol. 1 A-20, No. 5, pp. 1220-1223 (1984).

Fox et al., "Control Mechanisms of Flulidized Solids Circulation Between Adjacent Vessels," *AIChE Journal*, 35(12):1933-1941 (1989).

(56) References Cited

OTHER PUBLICATIONS

Smith, "Sludge-U-Like, As the Ban on Sea Disposal of Sewage Waste Looms, Technologies That Can Deliver Cleaner, Thicker and More Farmer-Friendly Sludges Are Gaining Popularity," *Water Bulletin*, 708 (1996).
Durkee et al., "Field Tests of Salt Recovery System for Spent Pickle Brine," *Journal of Food Service*, 38:507-511 (1973).
English-language translation of Hage, H., "The MeMon Experiment: A Step towards Large-Scale Processing of Manure," Applied Science, 4 (1988).
St. Onge et al., "Start-Up, Testing, and Performance of the First Bulb-Type Hydroelectric Project in the U.S.A.," *IEEE Transactions on Power Apparatus Systems*, PAS-101(6):1313-1321 (1982).
German Kurz, "Immersion Heater," OI U. Gasfeuerung, 18(3):171-180 (1973). English-language abstract only.
Hattori et al., "Fluid and Solids Flow Affecting the Solids Circulation Rate in Spouted Beds with a Draft Tube," *Journal of Chemical Engineering of Japan*, 37(9):1085-1091 (2004).
Yeh et al., "Double-Pass Heat or Mass Transfer Through a Parallel-Plate Channel with Recycle," *International Journal of Hat and Mass Transfer*, 43:487-491 (2000).
International Preliminary Report on Patentability for Application No. PCT/US2008/056702, dated Sep. 15, 2009.
International Search Report and Written Opinion for Application No. PCT/US08/56702, dated Jun. 10, 2008.
International Search Report and Written Opinion for Application No. PCT/US2010/024143, dated Oct. 12, 2010.
Mueller et al., "Rotating Disk Looks Promising for Plant Wastes," (2007).
Claflin, "Intraparticle Conduction Effects on the Temperature Profiles in Spouted Beds," Chemeca 85, paper D9b, The Thirteenth Australasian Conference on Chemical Engineering, Perth, Australia, pp. 471-475 (1985).
Dunn, "Incineration's Role in Ultimate Disposal of Process Wastes," *Chemical Engineering, Deskbook Issue*, pp. 141-150 (1975).
Fan et al., "Some Remarks on Hydrodynamic Behavior of a Draft Tube Gas-Liquid-Solid Fluidized Bed," AIChE Symposium Series, No. 234(80):91-97 (1985).
Etzensperger et al., "Phenol Degradation in a Three-Phase Biofilm Fluidized Sand Bed Reactor," *Bioprocess Engineering*, 4:175-181 (1989).
Yoshino et al., "Removal and Recovery of Phosphate and Ammonium as Struvite from Supernatant in Anaerobic Digestion," *Water Science and Technology*, 48(1):171-178 (2003).
Hocevar et al., "The Influence of Draft-Tube Pressure Pulsations on the Cavitation-Vortex Dynamics in a Francis Turbine," *Journal of Mechanical Engineering*, 49:484-498 (2003).
Padial et al., "Three-Dimensional Simulation of a Three-Phase Draft-Tube Bubble Column," *Chemical Engineering Science*, 55:3261-3273 (2000).
Swaminathan et al., "Some Aerodynamic Aspects of Spouted Beds of Grains," Department of Chemical Engineering, McGill University, Montreal, Quebec, Canada, pp. 197-204 (2007).
Williams et al., "Aspects of Submerged Combustion As a Heat Exchange Method," *Trans IChemE*, 71(A):308-309 (1993).
Sathyanarayana et al., Circular C.W. Intake System—A Research Opinion, Seventh Technical Conference of the British Pump Manufacturer's Association, paper 21, pp. 293-313, 1981.
Schone, "Oil Removal from Exhaust Steam and Condensate of Piston-Powered Steam Engines," *Braunkohle*, 31:82-92 (1932). English-language abstract only.
Shaw LFG Specialties, LLC, 2006 Product Catalog.
Cross et al., "Leachate Evaporation by Using Landfill Gas," Proceedings Sardinia 97, Sixth Landfill Symposium, S. Margherita di Pula, Cagliari, Italy, pp. 413-422 (1997).
Genck, "Guidelines for Crystallizer Selection and Operation," CEP, pp. 26-32 (2004). www.cepmagazine.org.
Written Opinion for Application No. PCT/US2010/024143, dated Oct. 12, 2010.

Shimizu et al., "Filtration Characteristics of Hollow Fiber Microfiltration Membranes Used in Membrane Bioreactor for Domestic Wastewater Treatment," *Wat. Res.*, 30(10):2385-2392 (1996).
Miyake et al., "Performance Characteristics of High Speed-Type Cross Flow Turbine," 83-0047:2575-2583 (1993).
Ye et al., "Removal and Distribution of Iron, Manganese, Cobalt, and Nickel Within a Pennsylvania Constructed Wetland Treating Coal Combustion By-Product Leachate," *J. Environ. Qual.*, 30:1464-1473 (2001).
English language translation of an office action from Chilean Patent Application No. 237-2007.
International Preliminary Report on Patentability for Application No. PCT/US2007/001487, dated Jul. 21, 2009.
International Preliminary Report on Patentability for Application No. PCT/US2007/001632, dated Jul. 21, 2009.
International Preliminary Report on Patentability for Application No. PCT/US2007/001633, dated Jul. 21, 2009.
International Preliminary Report on Patentability for Application No. PCT/US2007/001634, dated Jul. 21, 2009.
International Search Report for Application No. PCT/US2006/028515, dated Nov. 14, 2006.
Office action from Chilean Patent Application No. 238-2007.
International Search Report and Written Opinion for Application PCT/US2011/021811, dated Mar. 21, 2011.
MikroPul, "Wet Scrubbers," (2009). www.mikropul.com.
"Gas Atomized Venturi Scrubbers," Bionomic Industries, copyright 2008, printed from www.bionomicind.com <http://www.bionomicind.com> on May 25, 2011.
"Waste Heat Recovery Systems," Bionomic Industries, copyright 2008, printed from www.bionomicind.com <http://www.bionomicind.com> on May 25, 2011.
International Search Report and Written Opinion for Application No. PCT/US10/043647, dated Apr. 27, 2011.
International Search Report and Written Opinion for Application No. PCT/US10/043648, dated Apr. 27, 2011.
EVRAS—Evaporative Reduction and Solidification Systems; Brochure for Web. Believed to be publically available as early as Mar. 5, 2010.
Hill et al., "Produced Water and Process heat Combined Provide Opportunities for Shell CO2"; EVARAS; Facilities 2000: Facilities Engineering in the Next Millennium.
Layne Evaporative Reduction and Solidification System Brochure (2010).
Intevras Technologies, LLC—Innovative solutions for water purification, remediation and process improvement; Power Point Presentation, Oct. 2009.
Office Action issued for U.S. Appl. No. 12/705,462, dated Nov. 6, 2012.
Office Action issued for U.S. Appl. No. 12/846,257, dated Nov. 16, 2012.
International Preliminary Report on Patentability and Written Opinion issued for International Patent application No. PCT/US2011/021811, dated Aug. 14, 2012.
International Search Report for Application No. PCT/US2012/021897, dated Oct. 8, 2012.
Written Opinion for Application No. PCT/US2012/021897, dated Sep. 28, 2012.
English translation of Chinese First Office Action for Application No. 201080012067.7, dated Oct. 12, 2012.
English translation of Chinese Search Report for Application No. 201080012067.7, dated Sep. 12, 2012.
U.S. Office Action for U.S. Appl. No. 12/530,484, dated Apr. 16, 2013.
U.S. Office Action for U.S. Appl. No. 12/846,337, dated Apr. 17, 2013.
Rule 62 EPC Communication issued from the European Patent Office for Application No. 10741828.7, dated Jan. 31, 2013.
Rule 62 EPC Communication issued from the European Patent Office for Application No. 10805027.9, dated Feb. 5, 2013.
Rule 62 EPC Communication issued from the European Patent Office for Application No. 10805026.1, dated Feb. 27, 2013.

(56) References Cited

OTHER PUBLICATIONS

International Preliminary Report on Patentability for Application No. PCT/US2010/043647, dated Feb. 9, 2012.
International Preliminary Report on Patentability for Application No. PCT/US2010/043648, dated Feb. 9, 2012.
Shaw LFG Specialties, LCC "Waste Heat Leachate Evaporator System" (2011).
Mussatti, Daniel, Section 6, Particulate Matter Controls. Chapter 2 Wet Scrubbers for Particulate Matter. Innovative Strategies and Economics Group. United States Environmental protection Agency. Jul. 2002.
Office Action for U.S. Appl. No. 12/530,484, dated Feb. 29, 2012.
Office Action for U.S. Appl. No. 12/530,484, dated Oct. 17, 2012.
Office Action for U.S. Appl. No. 12/530,484, dated Apr. 16, 2013.
Office Action for U.S. Appl. No. 12/846,337, dated Apr. 17, 2013.
Chinese Office Action for Application No. 201180014846.5, dated Jun. 18, 2013.
Gaudlip et al; "Marcellus Shale Water Management Challenges in Pennsylvania," SPE Shale Gas Production Conference, Fort Worth (2008).
Search Report for Chinese Patent Application No. 201180014846.5, dated Jun. 8, 2013.
Alabovskij et al., "Concentration of Boiler Washing Water in Submerged-Combustion Devices," Promyshl. Energet, 4:38-39 (1975). English-language abstract only.
Bachand et al., "Denitrification in Constructed Free-Water Surface Wetlands: II. Effects of Vegetation and Temperature," Ecological Engineering, 14:17-32 (2000).
Barrett et al., "The Industrial Potential and Economic Viability of Spouted Bed Processes," Chemeca 85, paper D4c, The Thirteenth Australasian Conference on Chemical Engineering, Perth, Australia, pp. 401-405 (1985).
Bennett et al., "Design of a Software Application for the Simulation and Control of Continuous and Batch Crystallizer Circuits," Advances in Engineering Software, 33:365-374 (2002).
Berg, "The Development of the Controlled Buoyancy System for Installation of Submerged Pipelines," Journal AWWA, Water Technology/Quality, pp. 214-218 (1977).
Brandt et al., "Treatment Process for Waste Water Disposal of the "Morcinek" Mine Using Coalbed Methane," Conference on Coalbed Methane Utilization, Oct. 5-7, 1994.
Cherednichenko et al., "Disposal of Saline Wastes From Petroleum Refineries, All-Union Scientific-Research and Planning-Design Institute of the Petroleum Refining and Petrochemical Industry," Khimiya I Tekhnologiya Topliv I Masel, 9:37-39 (1974). Translated.
Claflin et al., "The Use of Spouted Beds for the Heat Treatment of Grains," Chemeca 81, The 9th Australasian Conference on Chemical Engineering, Christchurch, New Zealand, 4:65-72 (1981).
Final Office Action for U.S. Appl. No. 11/625,002, dated May 26, 2010.
Final Office Action for U.S. Appl. No. 11/625,022, dated Jan. 24, 2011.
Final Office Action for U.S. Appl. No. 11/625,024, dated Dec. 8, 2010.
Hill et al., "Produced Water and Process heat Combined Provide Opportunities for Shell CO2"; EVRAS; Facilities 2000: Facilities Engineering in the Next Millennium.
International Preliminary Report on Patentability for Application No. PCT/US2006/015803, dated Nov. 13, 2007.
International Preliminary Report on Patentability for Application No. PCT/US2006/028515, dated Jan. 22, 2008.
International Preliminary Report on Patentability for Application No. PCT/US2012/021897, dated Aug. 1, 2013.
International Preliminary Report on Patentability for Application No. PCT/US2012/021897, dated Jul. 23, 2013.
International Search Report and Written Opinion for Application No. PCT/US2006/015803, dated Oct. 30, 2007.
LFG Specialties, LLC, Waste Heat Leachate Evaporator System, Jan. 14, 2011.
Notice of Allowance for U.S. Appl. No. 11/625,159, dated Jul. 9, 2010.
Office Action for U.S. Appl. No. 11/625,002, dated Jan. 6, 2010.
Office Action for U.S. Appl. No. 11/625,022, dated Jun. 22, 2010.
Office Action for U.S. Appl. No. 11/625,024, dated Jun. 18, 2010.
Screen shots from video on LFG website taken Jan. 18, 2011 (http://www.shawgrp.com/markets/envservices/envsolidwaste/swlfg).

* cited by examiner

PORTABLE COMPACT WASTEWATER CONCENTRATOR

FIELD OF THE DISCLOSURE

This application relates generally to liquid concentrators, and more specifically to compact, portable, inexpensive wastewater concentrators that can be easily connected to and use sources of waste heat.

BACKGROUND

Concentration of volatile substances can be an effective form of treatment or pretreatment for a broad variety of wastewater streams and may be carried out within various types of commercial processing systems. At high levels of concentration, many wastewater streams may be reduced to residual material in the form of slurries containing high levels of dissolved and suspended solids. Such concentrated residual may be readily solidified by conventional techniques for disposal within landfills or, as applicable, delivered to downstream processes for further treatment prior to final disposal. Concentrating wastewater can greatly reduce freight costs and required storage capacity and may be beneficial in downstream processes where materials are recovered from the wastewater.

An important measure of the effectiveness of a wastewater concentration process is the volume of residual produced in proportion to the volume of wastewater entering the process. In particular, low ratios of residual volume to feed volume (high levels of concentration) are the most desirable. Where the wastewater contains dissolved and/or suspended non-volatile matter, the volume reduction that may be achieved in a particular concentration process that relies on evaporation of volatiles is, to a great extent, limited by the method chosen to transfer heat to the process fluid.

Conventional processes that affect concentration by evaporation of water and other volatile substances may be classified as direct or indirect heat transfer systems depending upon the method employed to transfer heat to the liquid undergoing concentration (the process fluid). Indirect heat transfer devices generally include jacketed vessels that contain the process fluid, or plate, bayonet tube or coil type heat exchangers that are immersed within the process fluid. Mediums such as steam or hot oil are passed through the jackets or heat exchangers in order to transfer the heat required for evaporation. Direct heat transfer devices implement processes where the heating medium is brought into direct contact with the process fluid, which occurs in, for example, submerged combustion gas systems.

Conventional direct and indirect concentration systems are generally large and stationary. As a result, wastewater streams are generally transported to the conventional concentration systems, sometimes over great distances. The transportation costs of moving the wastewater to the concentrator can make the difference whether a certain project is economically feasible. For example, natural gas wells generate produced water that must be disposed of in some way. Transporting the produced water to a fixed base concentration system may limit the number of economically feasible natural gas well sites.

In addition to being difficult to move, conventional concentration systems suffer from other problems, such as scaling of heat transfer surfaces, fouling of internal components due to high levels of suspended solids in the wastewater streams.

SUMMARY

A portable compact liquid concentrating device disclosed herein may be easily connected to a source of waste heat, such as a landfill gas flare or a combustion engine exhaust stack, and use this waste heat to perform a direct heat transfer concentration process without the need of large and expensive containment vessels and without a lot of expensive high temperature resistant materials. The compact liquid concentrator includes a gas inlet, a gas exit and a mixing or flow corridor connecting the gas inlet and the gas exit, wherein the flow corridor includes a narrowed portion that accelerates the gas through the flow corridor. A liquid inlet located between the gas inlet and the narrowed portion of the flow corridor, injects liquid into the gas stream at a point prior to the narrowed portion so that the gas-liquid mixture is thoroughly mixed within the flow corridor, causing a portion of the liquid to be evaporated or concentrated. A demister or fluid scrubber downstream of the narrowed portion, and connected to the gas exit, removes entrained liquid droplets from the gas stream and re-circulates the removed liquid to the liquid inlet through a re-circulating circuit. Fresh liquid to be concentrated is also introduced into the re-circulating circuit at a rate sufficient to offset the combined total of liquid evaporated in the flow corridor and any concentrated liquid that is withdrawn from the process. The portable compact liquid concentrating device may be mounted on a truck bed or skid for easy transportation to remote sites.

A method of preparing a portable wastewater concentrator for transportation to an operation site includes providing a wastewater concentrator having a flare assembly; an air pretreatment assembly; a concentrator assembly including a quenching section, a venturi section, and an elbow section; a fluid scrubber; and an exhaust section having a stack and an induction fan; removing the quenching section and the venturi section from the elbow section and securing the quenching section, the venturi section, and the elbow to a truck bed, and removing the stack from the induction fan and securing the stack and the induction fan to the truck bed.

DETAILED DESCRIPTION

Figure 1:
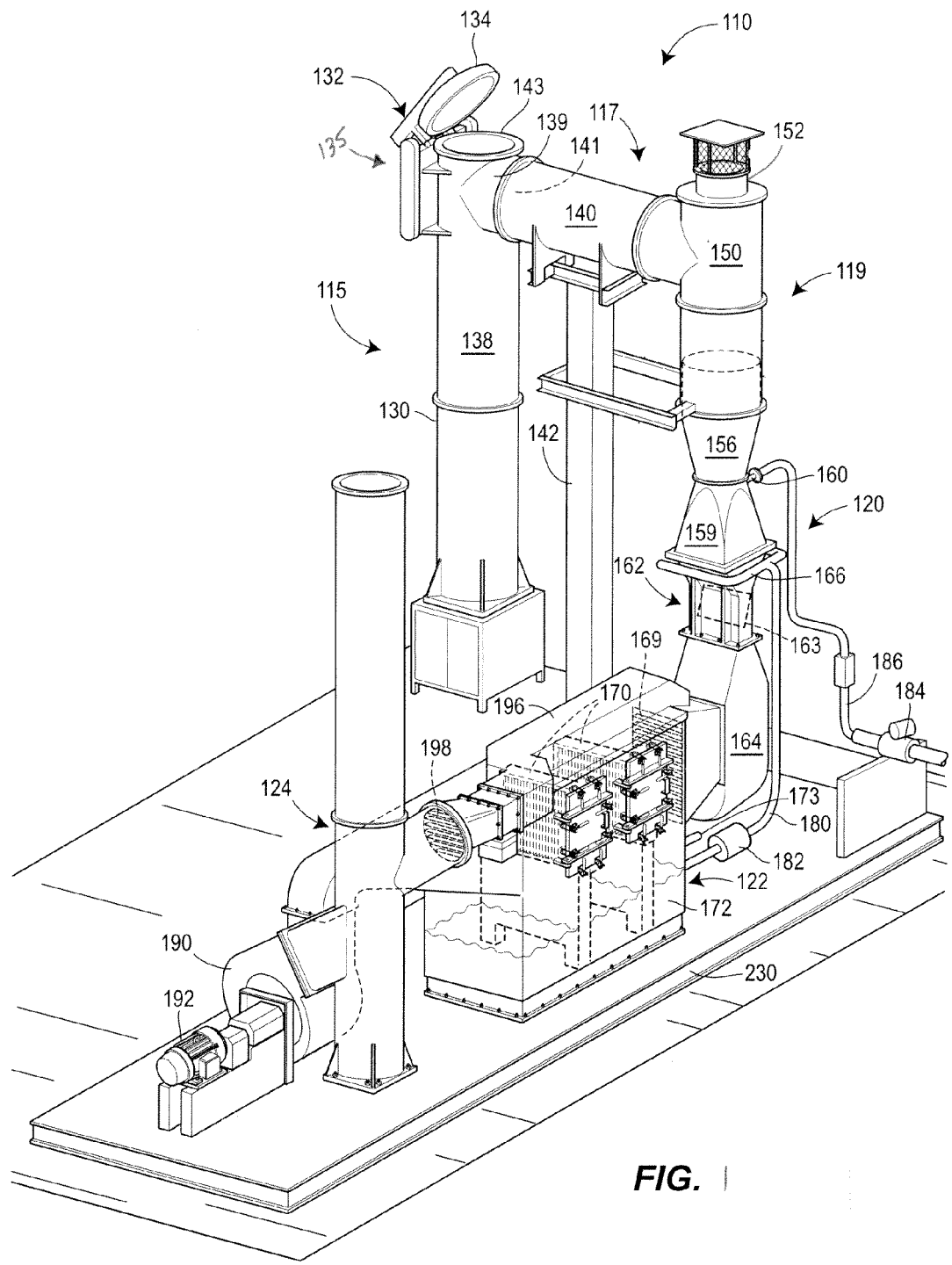
FIG. 1 is a perspective view of a portable compact liquid concentrator.

FIG. 1 illustrates one embodiment of a portable compact liquid concentrator 110, which is connected to a source of waste heat in the form of a landfill flare. Generally speaking, the compact liquid concentrator 110 of FIG. 1 operates to concentrate wastewater, such as landfill leachate or produced water from natural gas wells, using exhaust or waste heat created within a landfill flare (or a natural gas flare) which burns landfill gas (or natural gas) in a manner that meets the standards set by the U.S. Environmental Protection Agency (EPA). Typically, the gas exiting the flare is between 1000 and 1500 degrees Fahrenheit and may reach 1800 degrees Fahrenheit.

As illustrated in FIG. 1, the portable compact liquid concentrator 110 generally includes or is connected to a flare assembly 115, and includes a heat transfer assembly 117, an air pre-treatment assembly 119, a concentrator assembly 120, a fluid scrubber 122, and an exhaust section 124. The flare assembly 115 includes a flare 130, which burns landfill gas (or natural gas) therein according to any known principles, and a flare cap assembly 132. The flare cap assembly 132 includes a moveable cap 134 (e.g., a flare cap, an exhaust gas cap, etc.) which covers the top of the flare 130, or other type of stack (e.g., a combustion gas exhaust stack), to seal off the top of the flare 130 when the flare cap 134 is in the closed position, or to divert a portion of the flare gas in a partially closed position, and which allows gas produced within the flare 130 to escape to the atmosphere through an open end that forms a primary gas outlet 143, when the flare cap 134 is in an open or partially open position. The flare cap assembly 132 also includes a cap actuator 135, such as a motor (e.g., an electric motor, a hydraulic motor, a pneumatic motor, etc.) which moves the flare cap 134 between the fully open and the fully closed positions.

If desired, the flare 130 may include an adapter section 138 including the primary combustion gas outlet 143 and a secondary combustion gas outlet 141 upstream of the primary combustion gas outlet 143. When the flare cap 130 is in the closed position, combustion gas is diverted through the secondary combustion gas outlet 141. The adapter section 138 may include a connector section 139 that connects the flare 130 (or exhaust stack) to the heat transfer section 117 using a 90 degree elbow or turn.

The heat transfer assembly 117 includes a transfer pipe 140, which connects to an inlet of the air pre-treatment assembly 119 to the flare 130 and, more particularly, to the adaptor section 138 of the flare 130. A support member 142, in the form of a vertical bar or pole, supports the heat transfer pipe 140 between the flare 130 and the air pre-treatment assembly 119 at a predetermined level or height above the ground. The heat transfer pipe 140 is connected to the connector section 139 or the adapter section 138 at the secondary combustion gas outlet 141, the transfer pipe forming a portion of a fluid passageway between the adapter section 138 and a secondary process, such as a fluid concentrating process.

The air pre-treatment assembly 119 includes a vertical piping section 150 and an ambient air valve 152 disposed at the top of the vertical piping section 150. The ambient air valve 152 (also referred to as a bleed valve) forms a fluid passageway between the heat transfer pipe 140 (or air pre-treatment assembly 119) and the atmosphere. The ambient air valve 152 operates to allow ambient air to flow into the interior of the air pre-treatment assembly 119 to mix with the hot gas coming from the flare 130. The ambient air valve 152 generally allows the gas from the flare 130 to be cooled before entering into the concentrator assembly 120.

The concentrator assembly 120 includes a lead-in section 156 having a reduced cross-section which mates the bottom of the piping section 150 to a quencher 159 of the concentrator assembly 120. The concentrator assembly 120 also includes a first fluid inlet 160, which injects new or untreated liquid to be concentrated, such as landfill leachate or produced water, into the interior of the quencher 159. While not shown in FIG. 1, the inlet 160 may include a coarse sprayer with a large nozzle for spraying the untreated liquid into the quencher 159. As will be understood, the quencher 159 operates to quickly reduce the temperature of the gas stream (e.g., from about 900 degrees Fahrenheit to less than 200 degrees Fahrenheit) while performing a high degree of evaporation on the liquid injected at the inlet 160. If desired, but not specifically shown in FIG. 1, a temperature sensor may be located at or near the exit of the piping section 150 or in the quencher 159 and may be used to control the position of the ambient air valve to thereby control the temperature of the gas present at the inlet of the concentrator assembly 120.

The quencher 159 is connected to a liquid injection chamber which is connected to narrowed portion or venturi section 162 which has a narrowed cross section with respect to the quencher 159 and which has a venturi plate 163 disposed therein. The venturi plate 163 creates a narrow passage through the venturi section 162, which creates a large pressure drop between the entrance and the exit of the venturi section 162. This large pressure drop causes turbulent gas flow within the quencher 159 and the top or entrance of the venturi section 162, and causes a high rate of gas flow out of the venturi section 162, both of which lead to thorough mixing of the gas and liquid and thus evaporation of the liquid in the venturi section 162.

A re-circulating pipe 166 extends around opposite sides of the entrance of the venturi section 162 and operates to inject partially concentrated (i.e., re-circulated) liquid into the venturi section 162 to be further concentrated and/or to prevent the formation of dry particulate within the concentrator assembly 120 through multiple fluid entrances located on one or more sides of the flow corridor. A number of pipes, such as three pipes of, for example, ½ inch diameter, may extend from each of the opposites legs of the pipe 166 partially surrounding the venturi section 162, and through the walls and into the interior of the venturi section 162. Because the liquid being ejected into the concentrator 110 at this point is re-circulated liquid, and is thus either partially concentrated or being maintained at a particular equilibrium concentration and more prone to plug a spray nozzle than the less concentrated liquid injected at the inlet 160, this liquid may be directly injected without a sprayer so as to prevent clogging. However, if desired, a baffle in the form of a flat plate may be disposed in front of each of the openings of the ½ pipes to cause the liquid being injected at this point in the system to hit the baffle and disperse into the concentrator assembly 120 as smaller droplets. In any event, the configuration of this re-circulating system distributes or disperses the re-circulating liquid better within the gas stream flowing through the concentrator assembly 120.

The combined hot gas and liquid flows in a turbulent manner through the venturi section 162. As noted above, the venturi section 162, which has a moveable venturi plate 163 disposed across the width of the concentrator assembly 120, causes turbulent flow and complete mixture of the liquid and gas, causing rapid evaporation of the liquid within the gas. Because the mixing action caused by the venturi section 162 provides a high degree of evaporation, the gas cools substantially in the concentrator assembly 120, and exits the venturi section 162 into a flooded elbow 164 at high rates of speed. In fact, the temperature of the gas-liquid mixture at this point may be about 160 degrees Fahrenheit.

The bottom of the flooded elbow 164 has liquid disposed therein, and the gas-liquid mixture exiting the venturi section 162 at high rates of speed impinges on the liquid in the bottom of the flooded elbow 164 as the gas-liquid mixture is forced to turn 90 degrees to flow into the fluid scrubber 122. The interaction of the gas-liquid stream with the liquid within the flooded elbow 164 removes liquid droplets from the gas-liquid stream, and prevents suspended particles within the gas-liquid stream from hitting the bottom of flooded elbow 164 at high rates of speeds, thereby preventing erosion of the metal wall of the flooded elbow 164.

After leaving the flooded elbow 164, the gas-liquid stream in which evaporated liquid and some liquid and other particles still exist, flows through the fluid scrubber 122 which is, in this case, a cross-flow fluid scrubber. The fluid scrubber 122 includes various screens or filters which aid in removal of entrained liquids from the gas-liquid stream and removes other particles that might be present with the gas-liquid stream. In one particular example, the cross flow scrubber 122 may include an initial coarse impingement baffle 169 at the input thereof, which is designed to remove liquid droplets in the range of 50 to 100 microns in size or higher. Thereafter, two removable filters in the form of chevrons 170 are disposed across the fluid path through the fluid scrubber 122, and the chevrons 170 may be progressively sized or configured to remove liquid droplets of smaller and smaller sizes, such as 20-30 microns and less than 10 microns. Of course, more or fewer filters or chevrons could be used.

Liquid captured by the filters 169 and 170 gravity drains into a reservoir or sump 172 located at the bottom of the fluid scrubber 122. The sump 172, which may hold, for example 200 gallons of liquid or more, thereby collects concentrated fluid containing dissolved and suspended solids removed from the gas-liquid stream and operates as a reservoir for a source of re-circulating concentrated liquid back to the concentrator assembly 120 to be further treated and/or to prevent the formation of dry particulate within the concentrator assembly 120.

As illustrated in FIG. 1, a return line 180, as well as a pump 182, operate to re-circulate fluid removed from the gas-liquid stream from the sump 172 back to the concentrator 120 and thereby complete a fluid or liquid re-circulating circuit. Likewise, a pump 184 may be provided within an input line 186 to pump new or untreated liquid, such as landfill leachate, to the input 160 of the concentrator assembly 120. Also, one or more sprayers may be disposed inside the fluid scrubber 122 adjacent the chevrons 170 and may be operated periodically to spray clean water or a portion of the wastewater feed on the chevrons 170 to keep them clean.

Concentrated liquid also be removed from the bottom of the fluid scrubber 122 via the exit port 173 and may be further processed or disposed of in any suitable manner in a secondary re-circulating circuit. In particular, the concentrated liquid removed by the exit port 173 contains a certain amount of suspended solids, which preferably may be separated from the liquid portion of the concentrated liquid and removed from the system using a secondary re-circulating circuit. For example, concentrated liquid removed from the exit port 173 may be transported through a secondary concentrated wastewater circuit (not shown) to a solid/liquid separating device, such as a settling tank, a vibrating screen, a rotary vacuum filter, or a filter press. After the suspended solids and liquid portion of the concentrated wastewater are separated by the solid/liquid separating device, the liquid portion of the concentrated wastewater may be returned to the sump 172 for further processing in the first or primary re-circulating circuit connected to the concentrator.

The gas, which flows through and out of the fluid scrubber 122 with the liquid and suspended solids removed therefrom, exits out of piping or ductwork at the back of the fluid scrubber 122 (downstream of the chevrons 170) and flows through an induced draft fan 190 of the exhaust assembly 124, from where it is exhausted to the atmosphere in the form of the cooled hot inlet gas mixed with the evaporated water vapor. Of course, an induced draft fan motor 192 is connected to and operates the fan 190 to create negative pressure within the fluid scrubber 122 so as to ultimately draw gas from the flare 130 through the transfer pipe 140, the air pre-treatment assembly 119 and the concentrator assembly 120.

While the speed of the induced draft fan 190 can be varied by a device such as a variable frequency drive operated to create varying levels of negative pressure within the fluid scrubber 122 and thus can usually be operated within a range of gas flow capacity to assure complete gas flow from the flare 130, if the gas being produced by the flare 130 is not of sufficient quantity, the operation of the induced draft fan 190 cannot necessarily be adjusted to assure a proper pressure drop across the fluid scrubber 122 itself. That is, to operate efficiently and properly, the gas flowing through the fluid scrubber 122 must be at a sufficient (minimal) flow rate at the input of the fluid scrubber 122. Typically this requirement is controlled by keeping at least a preset minimal pressure drop across the fluid scrubber 122. However, if the flare 130 is not producing at least a minimal level of gas, increasing the speed of the induced draft fan 190 will not be able to create the required pressure drop across the fluid scrubber 122.

To compensate for this situation, the cross flow scrubber 122 may optionally include a gas re-circulating circuit which can be used to assure that enough gas is present at the input of the fluid scrubber 122 to enable the system to acquire the needed pressure drop across the fluid scrubber 122. In particular, the gas re-circulating circuit includes a gas return line or return duct 196 which connects the high pressure side of the exhaust assembly 124 (e.g., downstream of the induced draft fan 190) to the input of the fluid scrubber 122 (e.g., a gas input of the fluid scrubber 122) and a baffle or control mechanism 198 disposed in the return duct 196 which operates to open and close the return duct 196 to thereby fluidly connect the high pressure side of the exhaust assembly 124 to the input of the fluid scrubber 122. During operation, when the gas entering into the fluid scrubber 122 is not of sufficient quantity to obtain the minimal required pressure drop across the fluid scrubber 122, the baffle 198 (which may be, for example, a gas valve, a damper such as a louvered damper, etc.) is opened to direct gas from the high pressure side of the exhaust assembly 124 (i.e., gas that has traveled through the induced draft fan 190) back to the input of the fluid scrubber 122. This operation thereby provides a sufficient quantity of gas at the input of the fluid scrubber 122 to enable the operation of the induced draft fan 190 to acquire the minimal required pressure drop across the fluid scrubber 122. In some embodiments, the induced draft fan 190 may provide the necessary minimum gas flow rate and the gas re-circulating circuit may not be required.

The portable compact liquid concentrator 110 is also a very fast-acting concentrator. Because the portable compact liquid concentrator 110 is a direct contact type of concentrator, it is not subject to deposit buildup, clogging and fouling to the same extent as most other concentrators. Still further, the ability to control the flare cap 134 to open and close, depending on whether the concentrator 110 is being used or operated, allows the flare 130 to be used to burn gas without interruption when starting and stopping the concentrator 110. More particularly, the flare cap 134 can be quickly opened at any time to allow the flare 130 to simply burn gas as normal while the concentrator 110 is shut down. On the other hand, the flare cap 134 can be quickly closed when the concentrator 110 is started up, thereby diverting hot gasses created in the flare 130 to the concentrator 110, and allowing the concentrator 110 to operate without interrupting the operation of the flare 130. In either case, the concentrator 110 can be started and stopped based on the operation of the flare cap 134 without interrupting the operation of the flare 130.

Moreover, due to the compact configuration of the air pre-treatment assembly 119, the concentrator assembly 120 and the fluid scrubber 122, parts of the concentrator assembly 120, the fluid scrubber 122, the draft fan 190 and at least a lower portion of the exhaust section 124 can be permanently mounted on (connected to and supported by) a skid or plate 230, as illustrated in FIG. 1. The upper parts of the concentrator assembly 120, the air pre-treatment assembly 119 and the heat transfer pipe 140, as well as a top portion of the exhaust stack, may be removed and stored on the skid or plate 230 for transport, or may be transported in a separate truck. Because of the manner in which the lower portions of the concentrator 110 can be mounted to a skid or plate, the concentrator 110 is easy to move and install. In particular, during set up of the concentrator 110, the skid 230, with the fluid scrubber 122, the flooded elbow 164 and the draft fan 190 mounted thereon, may be offloaded at the site at which the concentrator 110 is to be used by simply offloading the skid 230 onto the ground or other containment area at which the concentrator 110 is to be assembled. Thereafter, the venturi section 162, the quencher 159, and the air pre-treatment assembly 119 may be placed on top of and attached to the flooded elbow 164. The piping section 150 may then be extended in height to match the height of the flare 130 to which the concentrator 110 is to be connected. In some cases, this may first require mounting the flare cap assembly 132 onto a pre-existing flare 130. Thereafter, the heat transfer pipe 140 may be raised to the proper height and attached between the flare 130 and the air pre-treatment assembly 119, while the support member 142 is disposed in place.

Because most of the pumps, fluid lines, sensors and electronic equipment are disposed on or are connected to the fluid concentrator assembly 120, the fluid scrubber 122 or the draft fan assembly 190, set up of the portable compact liquid concentrator 110 at a particular site does not require much fluid piping or electrical work at the site. As a result, the portable compact liquid concentrator 110 is relatively easy to install and to set up at (and to disassemble and remove from) a particular site. Moreover, because a majority of the components of the portable compact liquid concentrator 110 are permanently mounted to the skid 230, the portable compact liquid concentrator 110 can be easily transported around on a truck or other delivery vehicle and can be easily dropped off and installed at particular location, such as next to a landfill flare.

Figure 2:
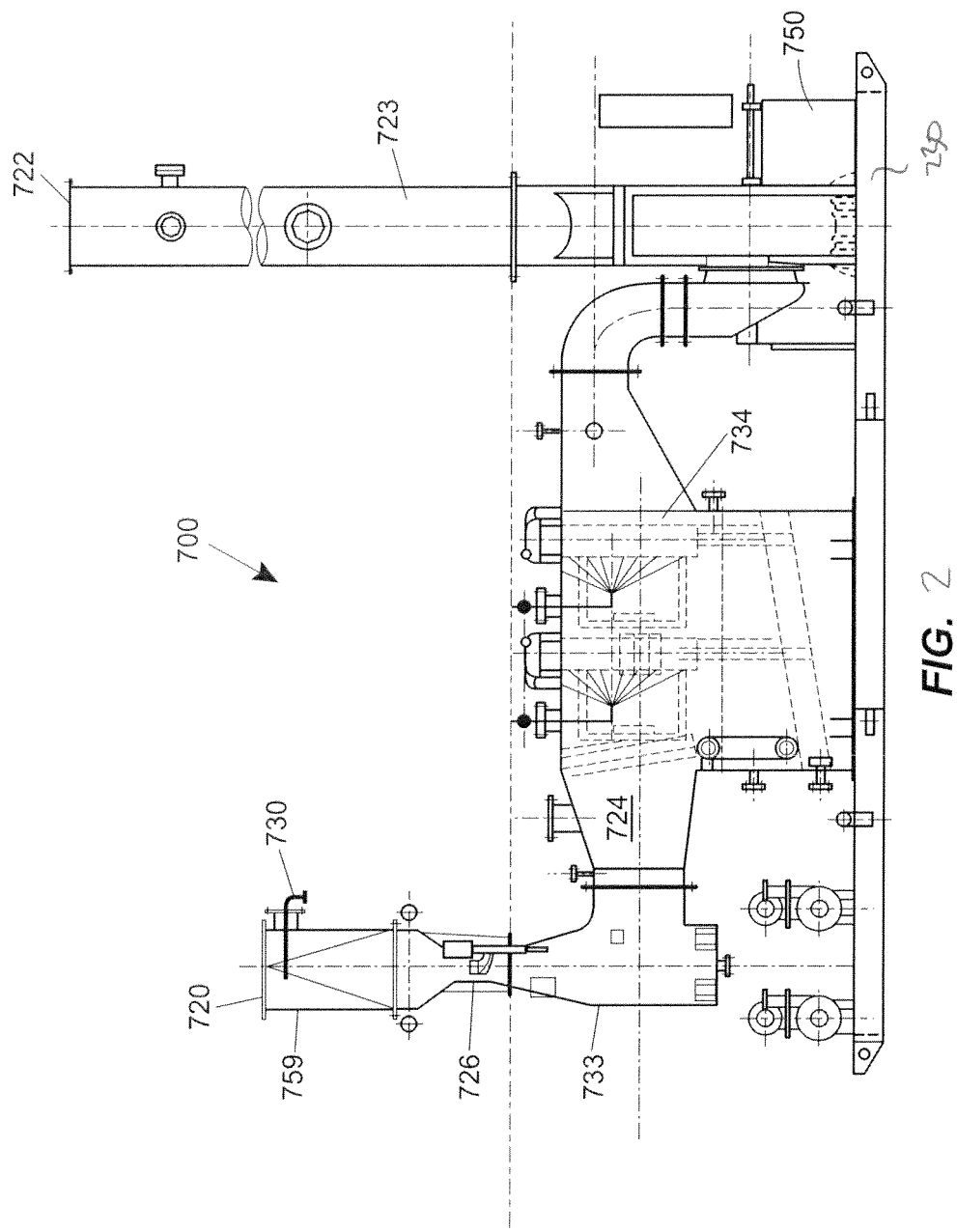
FIG. 2 is a side elevational cross-section of the liquid concentrating portion of the portable compact liquid concentrator of FIG. 1 mounted on a transport skid.
Figure 3:
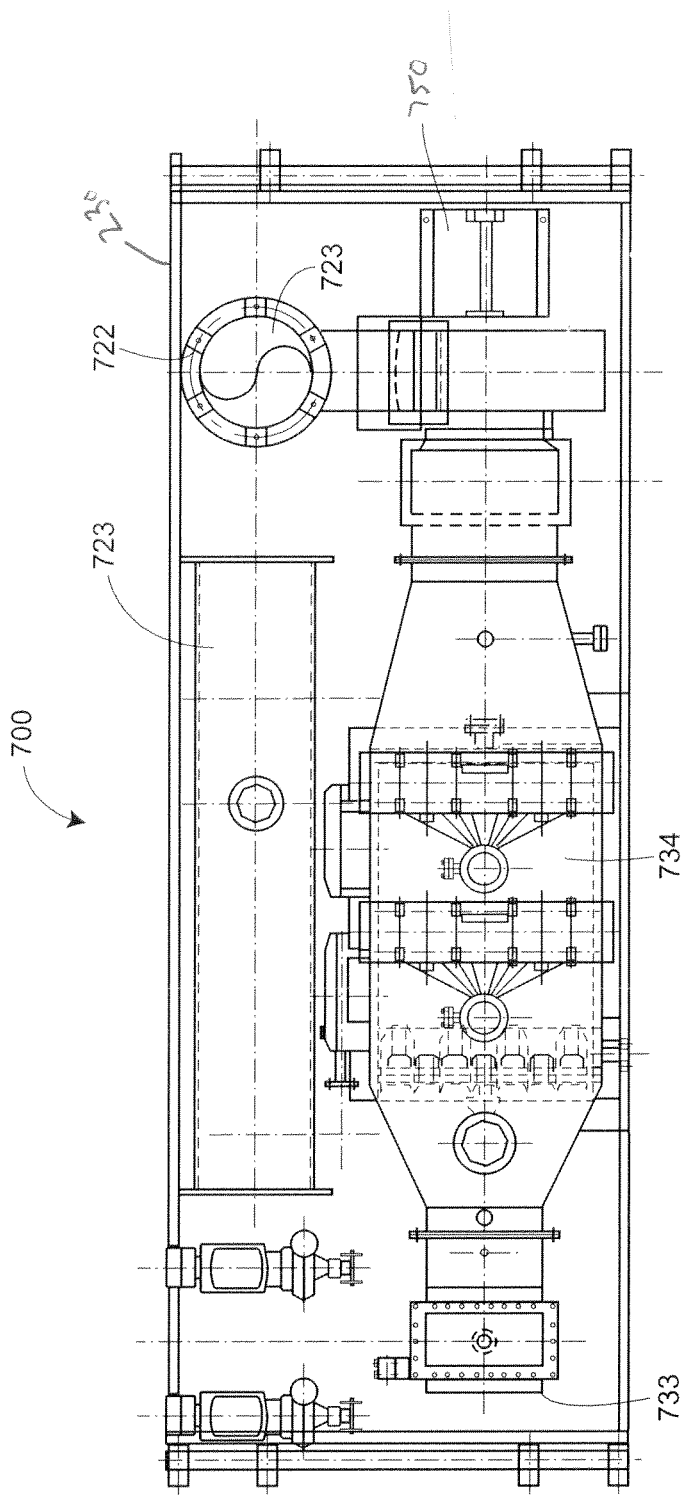
FIG. 3 is a top plan view of the liquid concentrating section of FIG. 2.

FIGS. 2 and 3 illustrate one embodiment of a portable compact liquid concentrator 700 mounted on a truck bed or skid 230. In one embodiment, some of the components of the portable compact liquid concentrator 700 may remain on the skid 230 and be used to perform concentration activities, while others of these components may be removed and installed near a source of waste heat. The portable compact liquid concentrator 700 has a gas inlet 720 and a gas exit 722. A flow corridor 724 connects the gas inlet 720 to the gas exit 722. The flow corridor 724 has a narrowed or venturi portion 726 that accelerates the gas through the flow corridor 724. Gas is drawn into a quencher section 759 by an induction fan 750. A liquid inlet 730 injects a liquid into the gas stream in the quencher section 759. Gas is directed from the venturi section 726 into the demister (or crossflow scrubber) 734 by an elbow section 733. After exiting the demister 734, the gas is directed to the gas exit 722 through a stack 723. Of course, as described above, some of these components may be removed from the bed and installed in close proximity to a source of waste heat while others of these components (such as the demister 734, the stack 723 and the gas exit 722) may remain on the skid 230.

As the gas-liquid mixture passes through the venturi portion 726 of the flow corridor 724, a portion of the liquid evaporates and is absorbed by the gas, thus consuming a large portion of heat energy within the waste heat as latent heat that exits the concentrator system 700 as water vapor within the exhaust gas.

In the embodiment shown in FIGS. 2 and 3, portions of the portable compact liquid concentrator 700 may be disassembled and mounted on a skid 230 for transportation. For example, the quenching section 759 and the venturi section 726 may be removed from the elbow section 733, as illustrated by the dashed line in FIG. 2. Likewise, the stack 723 may be removed from the induction fan 750 as illustrated by the dashed line in FIG. 2. The elbow section 733, demister 734, and induction fan 750 may be secured on a pallet or trailer skid 799 as a unit. The stack 723 may be secured separately to skid 230. The quenching section 759 and venturi section 726 may also be secured to the pallet or trailer skid 230, or alternatively transported separately. The compartmentalized construction of the liquid concentrator 700 simplifies transportation of the liquid concentrator 700.

Figure 4:
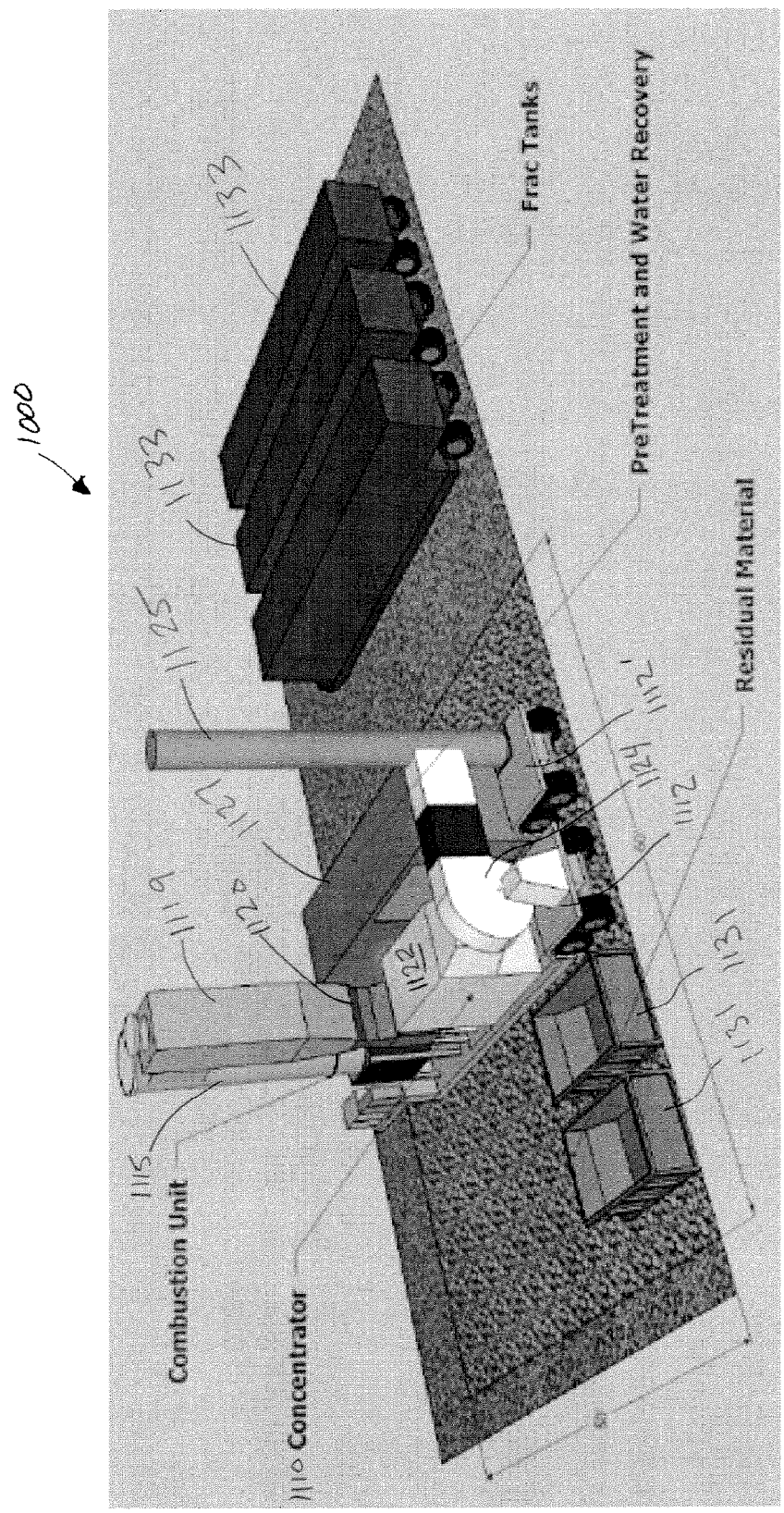
FIG. 4 is a perspective view of a wastewater concentration system including a portable compact liquid concentrator mounted on a truck bed.

FIG. 4 illustrates a wastewater concentration system 1000 including one embodiment of the portable compact liquid concentrator 1110 mounted on a first truck bed 1112 and a second truck bed 1112'. In this embodiment, the flare assembly 1115, the air pre-treatment assembly 1119, the concentrator assembly 1120, the fluid scrubber 1122, and the exhaust section 1124 are all mounted on the first truck bed 1112. An exhaust stack 1125 and a pre-treatment and/or water recovery section 1127 are mounted on the second truck bed 1112'. Because the portable compact liquid concentrator 1110 is mounted on one or more truck beds 1112, 1112', the portable compact liquid concentrator 1110 is easily transported to remote operating sites, such as natural gas well pads and landfills. The wastewater concentration system 1000 may also include residual material bins 1131 for disposal of residual solid or slurry material collected from the portable compact liquid concentrator 1110 and one or more frac tanks 1133 that hold reclaimed water from the pre-treatment and water recovery section 1127. The reclaimed water may be used as frac water for new natural gas wells.

While certain representative embodiments and details have been shown for purposes of illustrating the invention, it will be apparent to those skilled in the art that various changes in the methods and apparatus disclosed herein may be made without departing from the scope of the invention.

The invention claimed is:

1. A wastewater concentrator system comprising:
a portable compact wastewater concentrator including a flare assembly, an air pre-treatment assembly, a concentrator assembly, the concentrator assembly having a quenching section, a venturi section, and an elbow section, a fluid scrubber, and an exhaust section, the exhaust section having a gas exit, an induction fan, and a stack;
a pre-treatment and water recovery section;
a first truck bed, and
a second truck bed,
wherein the flare assembly, the air pre-treatment assembly, the concentrator assembly, the fluid scrubber and the exhaust section are mounted on the first truck bed for efficient transportation of the wastewater concentrator system to remote operating locations, the quenching section and the venturi section being removed from the elbow section and the stack being removed from the gas exit, the stack being secured to the first truck bed alongside the fluid scrubber, and the pre-treatment and water recovery section are mounted on the second truck bed.

2. The wastewater concentrator system of claim 1, wherein the first truck bed and the second truck bed are positioned adjacent one another and the compact wastewater concentrator is fluidly connected with the pre-treatment and water recovery section.

3. The wastewater concentrator system of claim 1, wherein the first and second truck beds are located adjacent to a natural gas well pad.

4. The wastewater concentrator system of claim 1, further comprising a residual material bin for storing concentrated slurry.

5. The wastewater concentrator system of claim 1, further comprising a frac tank for storing reclaimed liquid for further use in a fracking operation.

6. The wastewater concentrator system of claim 1, wherein the flooded elbow, a demister, and an induction fan are secured to the first truck bed as a unit.

* * * * *